(12) United States Patent
Kim et al.

(10) Patent No.: US 10,852,246 B2
(45) Date of Patent: Dec. 1, 2020

(54) PATTERN STRUCTURE INSPECTION DEVICE AND INSPECTION METHOD

(71) Applicants: THE WAVE TALK, INC., Daejeon (KR); KOREA ADVANCED INSTITUTE OF SCIENCE AND TECHNOLOGY, Daejeon (KR)

(72) Inventors: Young Dug Kim, Seongnam-si Gyeonggi-do (KR); Jongchan Park, Cheongju-si Chungcheongbuk-do (KR); Yongkeun Park, Daejeon (KR)

(73) Assignees: THE WAVE TALK, INC., Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 77 days.

(21) Appl. No.: 16/305,982

(22) PCT Filed: Jun. 1, 2017

(86) PCT No.: PCT/KR2017/005747
§ 371 (c)(1),
(2) Date: Nov. 30, 2018

(87) PCT Pub. No.: WO2017/209544
PCT Pub. Date: Dec. 7, 2017

(65) Prior Publication Data
US 2019/0212276 A1    Jul. 11, 2019

(30) Foreign Application Priority Data
Jun. 2, 2016  (KR) .................. 10-2016-0068563

(51) Int. Cl.
*G01N 21/95* (2006.01)
*G01N 21/47* (2006.01)
(Continued)

(52) U.S. Cl.
CPC ..... *G01N 21/9501* (2013.01); *G01N 21/4788* (2013.01); *G01N 21/9505* (2013.01);
(Continued)

(58) Field of Classification Search
CPC ......... G01N 2021/479; G01N 21/4788; G01N 2021/95615; G01N 21/88; G01N 21/9501;
(Continued)

(56) References Cited

U.S. PATENT DOCUMENTS 6,137,570 A * 10/2000 Chuang .............. G01N 21/9501
250/559.04
9,194,811 B1   11/2015 Zhao et al.
(Continued)

FOREIGN PATENT DOCUMENTS

CN        102027344 A    4/2011
JP        09-133621 A    5/1997
(Continued)

OTHER PUBLICATIONS

European Search Report dated May 6, 2019.

*Primary Examiner* — Steven Whitesell Gordon
(74) *Attorney, Agent, or Firm* — Rabin & Berdo, P.C.

(57) ABSTRACT

According to an aspect of the present invention, there is provided a pattern structure inspection method including irradiating a wave from a wave source onto a sample including a pattern region in which a structure having a certain pattern is provided on a substrate, collecting speckle data generated due to multiple scattering of the wave in the pattern region, by using a data collector, and analyzing whether the structure of the pattern region has a defect, by comparing the collected speckle data to reference speckle data.

6 Claims, 15 Drawing Sheets

(51) Int. Cl.
 *G02B 26/12* (2006.01)
 *G01N 21/956* (2006.01)
 *G02B 27/48* (2006.01)

(52) U.S. Cl.
 CPC . *G01N 21/95607* (2013.01); *G01N 21/95684* (2013.01); *G02B 26/12* (2013.01); *G02B 27/48* (2013.01); *G01N 2021/479* (2013.01); *G01N 2021/95615* (2013.01); *G01N 2201/0668* (2013.01)

(58) Field of Classification Search
 CPC ......... G01N 21/9505; G01N 21/95607; G01N 21/95684; G01N 2201/0668; G01N 21/47; G02B 27/48; G02B 26/12; G02B 26/123; G01B 9/02; G01B 9/02082
 See application file for complete search history.

(56) References Cited

U.S. PATENT DOCUMENTS

| | | |
|---|---|---|
| 2011/0240863 A1 | 10/2011 | Lee et al. |
| 2013/0182263 A1 | 7/2013 | Shchegrov et al. |
| 2015/0116717 A1 | 4/2015 | Manassen et al. |

FOREIGN PATENT DOCUMENTS

| | | |
|---|---|---|
| JP | 2003-139515 A | 5/2003 |
| JP | 2004-101189 A | 4/2004 |
| JP | 2007-322154 A | 12/2007 |
| JP | 2009-068872 A | 4/2009 |
| JP | 2013-083482 A | 5/2013 |
| KR | 10-2003-0075968 A | 9/2003 |
| KR | 10-2011-0110578 A | 10/2011 |
| WO | WO 2012/126008 A2 | 9/2012 |
| WO | WO 2015/107976 A1 | 7/2015 |

* cited by examiner

PATTERN STRUCTURE INSPECTION DEVICE AND INSPECTION METHOD

TECHNICAL FIELD

The present invention relates to an inspection apparatus and inspection method for inspecting a structure having a two-dimensional (2D) or three-dimensional (3D) pattern (hereinafter referred to a 'pattern structure'), by using a chaotic wave sensor.

BACKGROUND ART

A technology for generating a pattern region in which a structure having a certain pattern is provided on a substrate is broadly used in the industrial fields. A representative example thereof includes a technology for generating a minute pattern by selectively removing a metal or insulator coated on a substrate to a certain thickness, as in a semiconductor device, a display device, a microelectromechanical system (MEMS) device, or the like.

After a pattern is generated using the above technology, in some cases, inspection may be performed to determine whether the pattern is normally generated. To this end, a method of observing a top layer of the pattern by using an optical microscope or a method of detecting a defect on the surface of the pattern by using a probe has been generally used.

When a plurality of patterns are sequentially stacked on a substrate in a direction perpendicular to the substrate, a defect of lower patterns of a top-layer pattern may not be easily detected using the general inspection method. In particular, when the patterns are made of an optically opaque material, e.g., a metal, a top-layer metal pattern conceals lower patterns and thus optical observation of a defect of the lower patterns is not possible.

For example, in a semiconductor device manufacturing process, semiconductor devices such as memory devices and logic devices are generally manufactured by sequentially stacking layers having certain patterns, on a silicon wafer. FIG. 15 is a cross-sectional view of an example of a metal-oxide-semiconductor field-effect transistor (MOSFET) device. Referring to FIG. 15, active regions 801 and 802 doped with a dopant are generated in the surface of a silicon wafer, and a gate 803 of a MOS transistor is generated on the active regions 801 and 802. Various levels of metal wiring layers 805 and 806 for electrical conductivity and insulating layers 804 for electrical insulation are generated on the gate 803. Lastly, a passivation layer 808 for protecting the generated structures from an external environment is coated. As described above, in general, a semiconductor device has a structure in which elements from active regions to a passivation layer are sequentially stacked on one another.

In such a vertical stack structure, after a final process is completed, a defect of lower structures under a top layer may not be easily detected in a non-destructive manner.

FIGS. 8A to 8C are cross-sectional views of examples of multi-layer metallization structures. In FIGS. 8A to 8C, reference numeral 601 refers to first metal wires of a lower layer, reference numeral 602 refers to second metal wires of an upper layer, and an insulating layer 604 is generated between the first and second metal wires 601 and 602 extending in directions perpendicular to each other and vertically stacked on one another.

As illustrated in FIG. 8A, the first metal wires 601 are electrically conducted with the second metal wires 602 through a metal 603 filled in vias penetrating through the insulating layer 604. FIG. 8A corresponds to a case when the vias are normally buried. However, in some cases, due to an abnormal process, a via may not be normally buried and may have a void 610 therein as illustrated in FIG. 8B. Alternatively, an abnormal pattern 620 in which a via does not completely penetrate through the insulating layer 604 may occur as illustrated in FIG. 8C.

To determine whether a via has a void or whether a via is normally formed, an electrical test needs to be performed on a device after a manufacturing process is completed. To detect such a defect during the process, a wafer needs to be cut and a corresponding region needs to be observed using inspection equipment such as a transmission electron microscope (TEM) or a scanning electron microscope (SEM). Although observation of a local region is required to check an error of the process, a whole wafer needs to be destructed and thus quite much time and cost are required. In addition, the process is delayed by a time taken to check the process.

The above problems may commonly occur not only in semiconductor devices but also in various other devices manufactured by sequentially stacking multiple pattern layers.

DETAILED DESCRIPTION OF THE INVENTION

Technical Problem

The present invention provides an inspect apparatus and inspection method capable of non-destructively detecting not only a defect of a pattern in a top layer of a multilayer pattern region on a substrate but also a defect of patterns thereunder. However, the scope of the present invention is not limited thereto.

Technical Solution

According to an aspect of the present invention, there is provided a pattern structure inspection method including irradiating a wave from a wave source onto a sample including a pattern region in which a structure having a certain pattern is provided on a substrate, collecting speckle data generated due to multiple scattering of the wave in the pattern region, by using a data collector, and analyzing whether the structure of the pattern region has a defect, by comparing the collected speckle data to reference speckle data.

The collecting of the speckle data may be performed in an area between the sample and the data collector or in an internal area of the data collector.

The collecting of the speckle data may be performed in an area between a first surface including a first point spaced apart from a surface of the sample by a first distance, and a second surface including a second point spaced apart from the surface of the sample by a second distance greater than the first distance.

The pattern structure inspection method may further include generating a three-dimensional (3D) speckle image by using a plurality of speckle signals detected by a plurality of data collectors, when the data collector includes the plurality of data collectors.

The collecting of the speckle data may further include amplifying a number of times that the wave is multiple-scattered in the sample, by reflecting at least some waves multiple-scattered and emitted from the sample, back to the sample.

The wave irradiated from the wave source may include a laser beam.

The sample may have a structure in which a plurality of patterns are sequentially stacked on a substrate in a direction perpendicular to the substrate.

The structure of the sample may include a pattern region made of metal and a pattern region made of an insulator.

According to an aspect of the present invention, there is provided a pattern structure inspection method for inspecting a pattern structure in a plurality of equal pattern regions spaced apart from each other by a certain distance and periodically repeated on a substrate, the method including performing a first operation for arbitrarily selecting a first pattern region among the plurality of pattern regions, irradiating a wave from a wave source onto the first pattern region, collecting speckle data generated due to multiple scattering of the wave in the first pattern region, and storing the collected data in a database (DB), performing a second operation for repeatedly performing the first operation on another at least one pattern region spaced apart from the first pattern region, and storing speckle data of the other pattern region in the DB, setting a criterion for determining a defect of each pattern region, by analyzing the speckle data collected in the first and second operations, and comparing the speckle data of each pattern region, which is stored in the DB, to the criterion, and determining.

According to an aspect of the present invention, there is provided a pattern structure inspection apparatus including a wave source for irradiating a wave onto a sample including a pattern region in which a structure having a certain pattern is provided on a substrate, a data collector for collecting speckle data generated due to multiple scattering of the irradiated wave by the sample, and a data analyzer for receiving and analyzing the speckle data collected by the data collector, and outputting an analysis result on a display.

The data collector may collect the speckle data in an area between the sample and the data collector or in an internal area of the data collector.

The data collector may collect the speckle data in a first area spaced apart from a surface of the sample by a certain distance.

The first area may be located between a first surface including a first point spaced apart from the surface of the sample by a first distance, and a second surface including a second point spaced apart from the surface of the sample by a second distance greater than the first distance.

The first area may be located between a first surface including a first point spaced apart from the surface of the sample by a first distance, and a second surface including a second point spaced apart from the surface of the sample by a second distance greater than the first distance.

The pattern structure inspection apparatus may further include a three-dimensional (3D) image generator for generating a 3D speckle image by using a plurality of speckle signals detected by a plurality of data collectors, when the data collector includes the plurality of data collectors, and the controller analyzes characteristics of the sample by using the 3D speckle image.

The pattern structure inspection apparatus may further include a multiple scattering amplifier for amplifying a number of times that the wave is multiple-scattered in the sample, by reflecting at least some waves multiple-scattered and emitted from the sample, back to the sample.

The multiple scattering amplifier may include a first multiple scattering amplifier located on an extension line passing through a center of the sample, to reflect at least some waves multiple-scattered and emitted from the sample, back to the sample, and a second multiple scattering amplifier located at an opposite side of the first multiple scattering amplifier with respect to the sample, to reflect at least some waves multiple-scattered and emitted from the sample, back to the sample.

According to an aspect of the present invention, there is provided a pattern structure inspection apparatus including a sample holder accommodating a sample and a reference sample holder accommodating a reference sample, a wave source for irradiating a wave onto the sample and the reference sample, a data collector for collecting speckle data generated due to multiple scattering of the irradiated wave by each of the sample and the reference sample, and a data analyzer for receiving and analyzing the speckle data collected by the data collector, and outputting an analysis result on a display, wherein each of the sample and the reference sample includes a pattern region in which a structure having a certain pattern is provided on a substrate.

The data collector may collect the speckle data in an area between the sample and the data collector or in an internal area of the data collector.

The pattern structure inspection apparatus may further include a multi-beam reflector for splitting the wave incident from the wave source, and providing the split waves along a plurality of paths, and a beam splitter located on the plurality of paths of the waves provided by the multi-beam reflector, to change paths of waves reflected and emitted from the sample and the reference sample, and provide the waves to the data collector.

Advantageous Effects

As described above, according to an embodiment of the present invention, a defect of a multi-layer pattern structure on a substrate may be rapidly detected in a non-destructive manner. According to an embodiment of the present invention, not only a defect of a pattern in a top layer of the pattern structure but also a defect of patterns thereunder may be rapidly detected. However, the scope of the present invention is not limited to the above effects.

DESCRIPTION OF THE DRAWINGS

FIG. 13A shows a laser speckle result of the structure illustrated in FIG. 12A, and FIG. 13B shows a laser speckle result of the structure illustrated in FIG. 12B.

BEST MODE

Figure 1A:
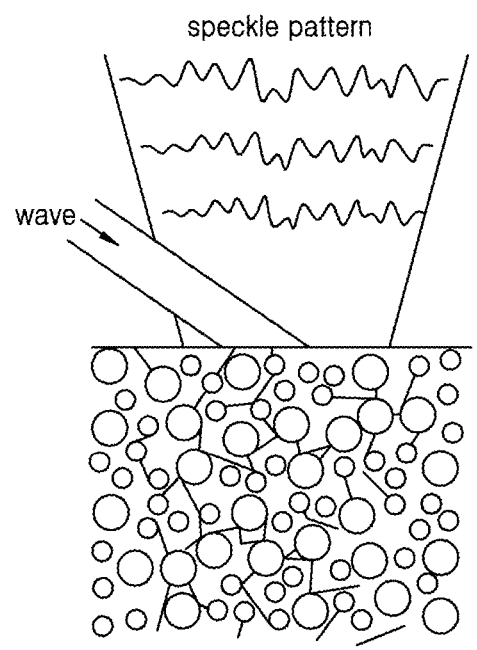
FIGS. 1A and 1B are cross-sectional views for describing an operating principle of a chaotic wave sensor according to an embodiment of the present invention.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the sizes of elements may be exaggerated or reduced for convenience of explanation.

When a beam is irradiated onto a material having a uniform refractive index, e.g., glass, the beam is refracted to a certain direction. However, when a coherent beam such as a laser beam is irradiated onto a material having a non-uniform refractive index, the beam is very complicatedly multiple-scattered in the material.

Referring to FIG. 1A, a beam or wave (hereinafter representatively referred to as the wave) irradiated from a wave source is multiple-scattered along complicated paths and some of the waves pass through an inspection target surface. Constructive or destructive interference occurs between the waves passing through multiple points of the inspection target surface and thus grain-shaped speckles are generated.

The waves scattered along the complicated paths are called "chaotic waves" in this specification, and the chaotic waves may be detected using laser speckles. When coherent light (e.g., a laser beam) is irradiated onto a stable medium, a material of which does not move as time passes, as shown in FIG. 1A, a stable speckle pattern may be observed. In this specification, an apparatus for measuring a speckle pattern is defined as a chaotic wave sensor.

According to an embodiment of the present invention, a chaotic wave sensor for irradiating a wave of a certain wavelength from a wave source to a sample such as a pattern structure (i.e., a structure in which a pattern region is provided on at least a part of a substrate), and analyzing speckles generated from the sample. The chaotic wave sensor is an apparatus for detecting a defect of a partial region of the pattern structure and thus may be called a pattern structure inspection apparatus.

Figure 1B:
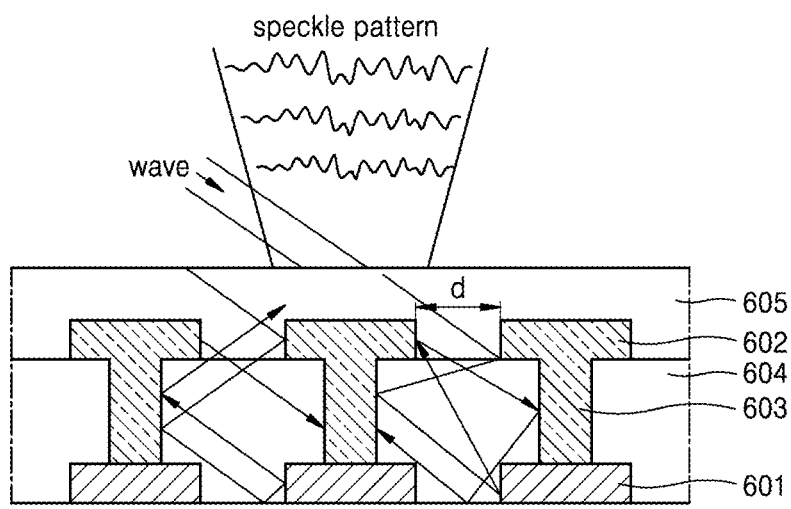

FIG. 1B shows an example of a speckle pattern in a case when a semiconductor device having a multi-layer metallization structure is used as a sample. In general, a pattern structure of the semiconductor device includes a plurality of materials having different optical characteristics, e.g., different refractive indices or transmittances. For example, referring to FIG. 1B, metals (e.g., 601, 602, and 603) are opaque electrical conductors and thus do not transmit visible light whereas electrical insulators (e.g., 604 and 605) are made of silicon oxide or silicon nitride and have high transmittances in a visible light range.

A first insulating layer 604 is provided between first metal wires 601 and second metal wires 602, and a second insulating layer 605 is provided on the second metal wires 602.

A representative material of the first and second insulating layers 604 and 605 may include silicon oxide ($SiO_2$) but any other transparent insulating material capable of transmitting light may also be used. Examples of a material of the first and second metal wires 601 and 602 may include aluminum (Al), tungsten (W), and copper (Cu).

Referring to FIG. 1B, spaces d are generated due to patterning of the second metal wires 602 in a top layer of the semiconductor device, and the second insulating layer 605 for insulation is filled in the spaces d. For example, a laser beam irradiated onto the surface of the sample enters or passes through the spaces d between the second metal wires 602 and then is multiple-scattered. For example, the laser beam is reflected on the surface of a metal 603 filled in vias or on the surfaces of the first metal wires 601 connected to the metal 603 from below, is scattered back to the second metal wires 602, and exits the sample. In this procedure, laser speckles are generated due to constructive/destructive interference of waves. Therefore, a pattern of the laser speckles may be determined based on a structure of the sample (e.g., metal wires, vias, and insulating layers), and a variation in the structure may lead to a variation in the pattern of the laser speckles.

In a pattern structure inspection apparatus according to an embodiment of the present invention, any type of source device capable of generating a wave may be used as a wave source. For example, a laser capable of irradiating a wave of a certain wavelength band may be used. The present invention is not limited by the type of the wave source. However, for convenience of explanation, the following description assumes that a laser is used as a wave source (or light source). The pattern structure inspection apparatus according to an embodiment of the present invention uses a laser as a light source and thus may be called a laser inspection apparatus.

The pattern structure inspection apparatus according to an embodiment of the present invention includes a light source for irradiating a laser beam, a sample holder supporting a sample, a data collector for collecting data about laser speckles generated due to multiple scattering of the laser beam irradiated onto the sample, and a data analyzer for analyzing the collected data and outputting the analysis result on a display to a user. The data analyzer may include a controller and the display. The controller analyzes the collected data and transmits the analysis result to the display. The display outputs the received analysis result to outside.

Figure 2:
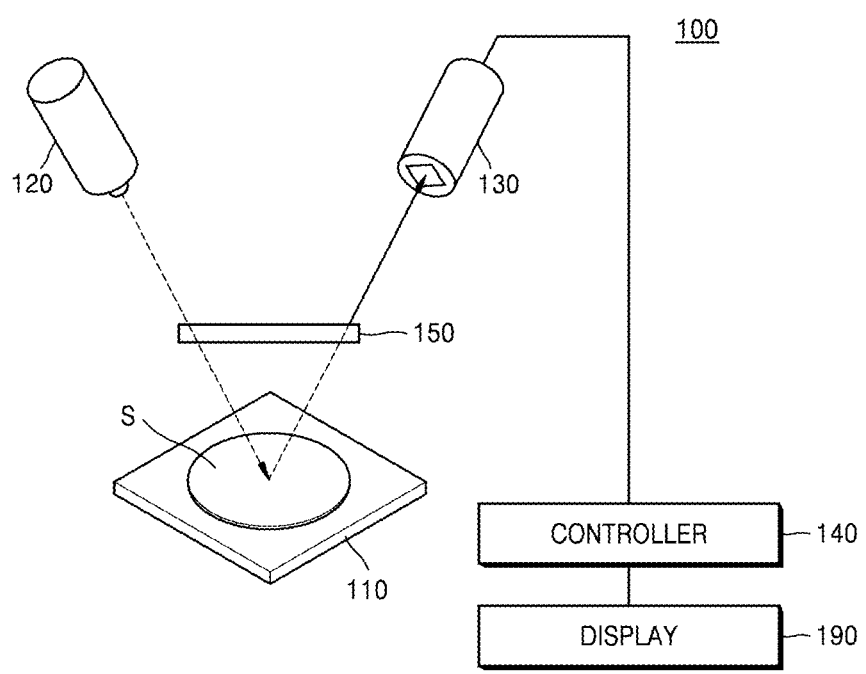
FIG. 2 is a conceptual view of a pattern structure inspection apparatus according to a first embodiment of the present invention.
Figure 3:
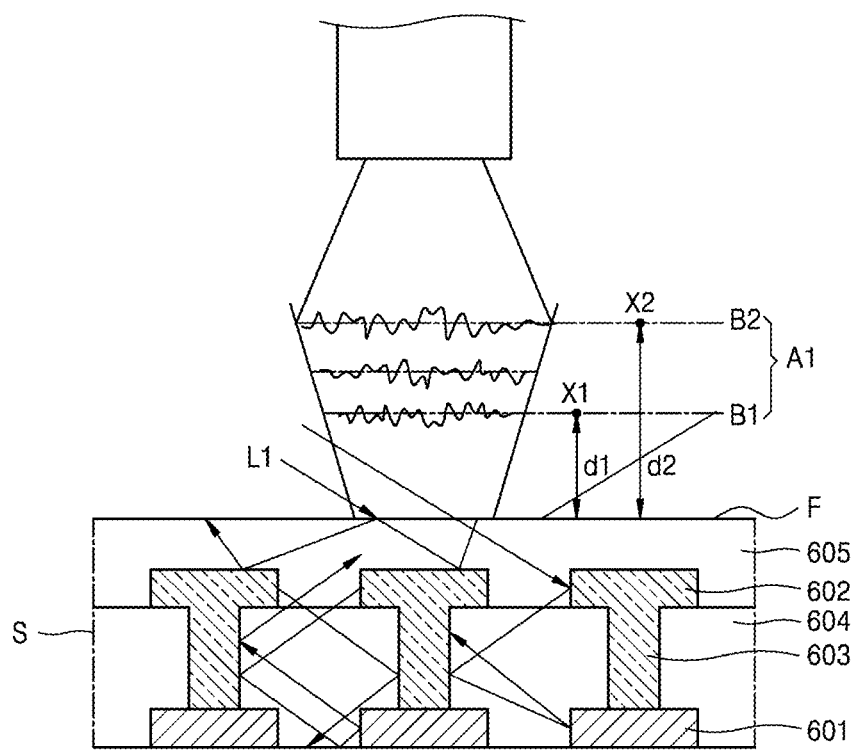
FIG. 3 is a cross-sectional view for describing a laser speckle detection method of a data collector of FIG. 1.
Figure 4A:
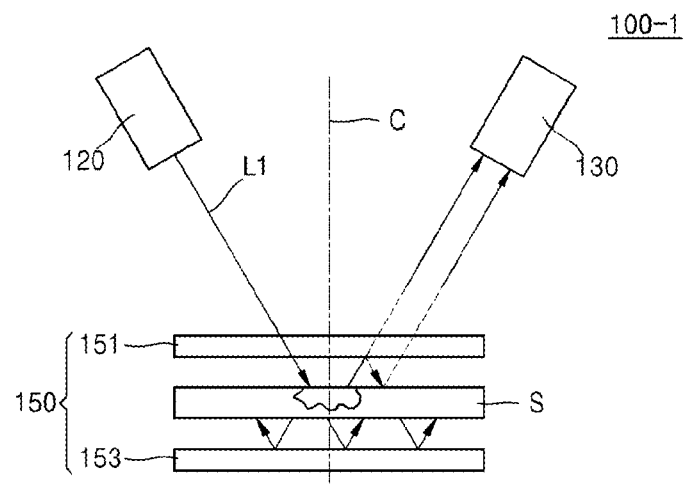
FIGS. 4A to 4C are conceptual views of implemental examples of the pattern structure inspection apparatus of FIG. 1.
Figure 4B:
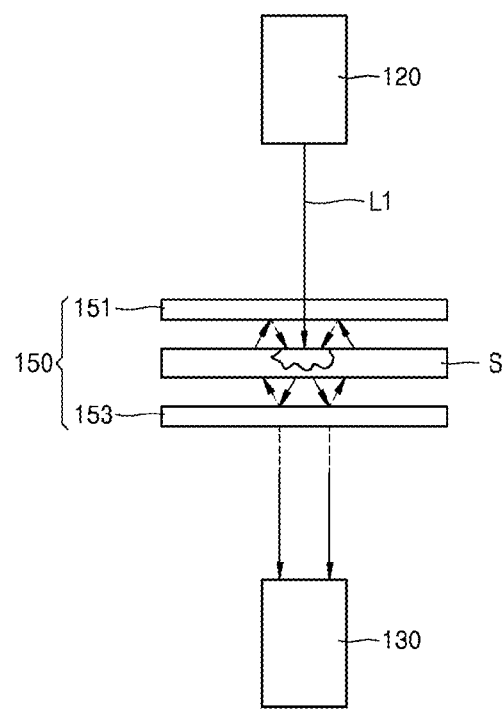
Figure 4C:
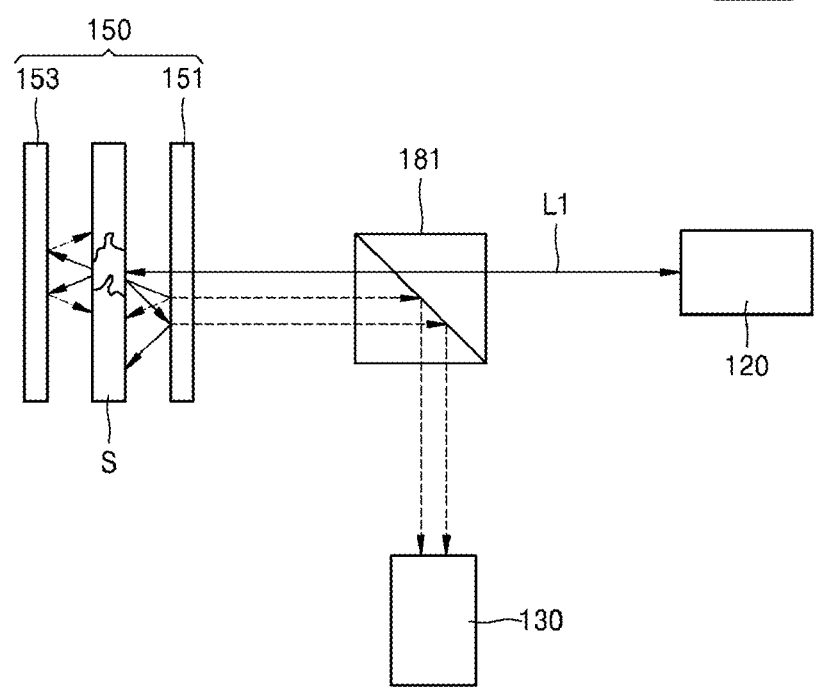

FIG. 2 is a conceptual view of a pattern structure inspection apparatus 100 according to a first embodiment of the present invention, and FIG. 3 is a cross-sectional view for describing a laser speckle detection method of a data collector 130 of FIG. 1. FIGS. 4A to 4C are conceptual views of implemental examples of the pattern structure inspection apparatus 100.

Referring to FIG. 2, the pattern structure inspection apparatus 100 according to the first embodiment of the present invention may include a light source 120 and the data collector 130. The pattern structure inspection apparatus 100 may further include a sample holder 110, a multiple scattering amplifier 150, a controller 140, and a display 190.

The light source 120 may irradiate a wave toward a sample S in the sample holder 110. For example, a laser wave having good coherence may be used to generate speckles on the sample holder 110. In this case, when a spectral bandwidth of the laser wave, which determines coherence of the laser wave, is short, accuracy of measurement may be high. That is, the accuracy of measurement may increase in proportion to a coherence length. As such, the light source 120 may irradiate a laser wave having a spectral bandwidth less than a predefined reference bandwidth. When the spectral bandwidth is much less than the reference bandwidth, the accuracy of measurement may greatly increase. For example, the spectral bandwidth of the laser wave may be set to be equal to or less than 1 nm.

The data collector 130 may include a sensing means corresponding to the type of the light source 120. For example, when a light source for irradiating visible light is used, an image capturing apparatus such as a camera or an image sensor may be included.

A camera capable of measuring two-dimensional (2D) data is preferable but a camera capable of measuring one-dimensional (1D) data may also be used. For example, to measure a laser speckle signal provided from the sample S, the camera may face and be tilted by a certain angle from a light-incident surface of the sample S.

According to an embodiment, the data collector 130 may include an image sensor and one or more lenses having a certain focal length, to detect laser speckles. In this case, the focal length may be less than the distance between the sample S and the data collector 130 but is not limited thereto. According to another embodiment, an image sensor having no lenses may be used as the data collector 130.

Referring to FIG. 3, the data collector 130 may detect laser speckles generated due to multiple scattering of the wave irradiated onto the sample S. In other words, the data collector 130 may detect laser speckles caused from the sample S.

Specifically, the data collector 130 may detect the laser speckles on a surface F of the sample S, or may detect the laser speckles at every preset timing in a first area A1 on a path of the waves multiple-scattered by the sample S. In this case, the first area A1 may be an area spaced apart from the surface F of the sample S by a certain distance. According to an embodiment, the first area A1 may be an area provided between a first surface B1 including a first point x1 spaced apart from the surface F of the sample S by a first distance d1 and a second surface B2 including a second point x2 spaced apart from the surface F of the sample S by a second distance d2 greater than the first distance d1. That is, the laser speckles may be detected in the first area A1 between the data collector 130 and the sample S. Otherwise, the laser speckles may be detected in an internal area of the data collector 130, for example, on the surface of a CCD sensor when the data collector 130 includes the CCD sensor.

According to another embodiment, the data collector 130 may detect the laser speckles by using an image sensor. Compared to a case when the laser speckles are observed on the surface F of the sample S, when the laser speckles are detected using the image sensor, the focal length for detecting the laser speckles may be reduced.

When the image sensor is used as the data collector 130, the image sensor may be located in such a manner that a size d of pixels is less than or equal to a grain size of a speckle pattern.

Referring to FIGS. 4A to 4C, the pattern structure inspection apparatus 100 according to an embodiment of the present invention may further include the multiple scattering amplifier 150. The multiple scattering amplifier 150 may amplify the number of times that the wave is multiple-scattered in the sample S, by reflecting at least some waves multiple-scattered and emitted from the sample S, back to the sample S.

The multiple scattering amplifier 150 may include a multiple scattering material. For example, the multiple scattering material may include particles having a large refractive index and having a diameter of a micrometer or smaller unit, e.g., titanium oxide ($TiO_2$) nanoparticles, and the multiple scattering amplifier 150 may reflect at least some waves incident on the multiple scattering amplifier 150.

The multiple scattering amplifier 150 may be located adjacent to the sample S in such a manner that the waves multiple-scattered and emitted from the sample S travel back and forth between the sample S and the multiple scattering amplifier 150 by at least once.

The pattern structure inspection apparatus 100 according to an embodiment of the present invention may increase sensitivity of detecting a minute abnormal region included in the sample S, by amplifying the number of times that the wave is multiple-scattered in the sample S, by using the multiple scattering amplifier 150.

The multiple scattering amplifier 150 may reflect some of incident waves and transmit the other. The multiple scattering amplifier 150 may transmit some of incident waves and reflect the other. Otherwise, the multiple scattering amplifier 150 may reflect all of incident waves. At least one multiple scattering amplifier 150 may be selected to correspond to an optical system structure of the light source 120 and the data collector 130.

Referring to FIG. 4A, in a pattern structure inspection apparatus 100-1, an optical system including the light source 120 and the data collector 130 may be configured as a reflective optical system. A wave L1 incident on the sample S may be multiple-scattered due to non-uniform optical characteristics of the sample S and some waves may be reflected out. In this case, the data collector 130 may measure laser speckles caused by the sample S, by capturing an image of a laser speckle signal of the waves reflected and emitted from the sample S due to the non-uniform optical characteristics of the sample S.

The pattern structure inspection apparatus 100-1 may include a first multiple scattering amplifier 151 and a second multiple scattering amplifier 153. The first multiple scattering amplifier 151 may be located on an extension line C passing through the center of the sample S, and may reflect at least some waves multiple-scattered and emitted from the sample S, back to the sample S.

The second multiple scattering amplifier 153 may be located at an opposite side of the first multiple scattering amplifier 151 with respect to the sample S, and may reflect at least some waves multiple-scattered and emitted from the sample S, back to the sample S. In the reflective optical system, the first multiple scattering amplifier 151 may be configured as a transflective multiple scattering amplifier for transmitting some of incident waves and reflecting the other.

The second multiple scattering amplifier 153 may be configured as a reflective multiple scattering amplifier for reflecting all of incident waves. As such, the number of times that the wave is multiple-scattered in the sample S may be remarkably amplified.

In FIG. 4A, a wavelength, an amplitude, etc. of the wave irradiated from the light source 120 may not be particularly limited. As the data collector 130, a camera capable of measuring 2D data is preferable but a camera capable of measuring 1D data may also be used.

In FIG. 4A, the light source 120 and the sample S are not limited any particular locations. The data collector 130 for measuring the reflected laser speckle signal may be located in such a manner that the size of a measured speckle corresponds to two or three pixels of the data collector 130. For example, to measure the laser speckle signal of the waves reflected from the sample S, the data collector 130 may be tilted by a certain angle from a light-incident surface of the sample S.

Referring to FIG. 4B, in a pattern structure inspection apparatus 100-2, an optical system including the light source 120 and the data collector 130 may be configured as a transmissive optical system. A wave L1 incident on the sample S may be multiple-scattered due to non-uniform optical characteristics of the sample S and some waves may be transmitted through and emitted from the sample S.

Then, the data collector 130 may measure laser speckles caused by the sample S, by capturing an image of a laser speckle signal of the waves transmitted through and emitted from the sample S.

When the pattern structure inspection apparatus 100-2 has a transmissive optical system, each of the first and second multiple scattering amplifiers 151 and 153 may be configured as a transflective multiple scattering amplifier for transmitting some of incident waves and reflecting the other.

Referring to FIG. 4C, in a pattern structure inspection apparatus 100-3, an optical system including the light source 120 and the data collector 130 may be configured as a spectral optical system. A wave L1 incident on the sample S may be multiple-scattered due to non-uniform optical characteristics of the sample S and some waves may be reflected out. In this case, a beam splitter 181 may be used to change a path of the waves toward the data collector 130.

The spectral optical system uses polarization of the waves and thus may further include an optical unit such as a phase retarder or a polarizer. In this case, the data collector 130 may be located between the light source 120 and the sample S and may change the path of the waves reflected and emitted from the sample S. In addition, the data collector 130 may measure laser speckles of the waves which are path-changed after being reflected from the sample S.

When the pattern structure inspection apparatus 100-3 has a spectral optical system, the first multiple scattering amplifier 151 may be configured as a transflective multiple scattering amplifier for transmitting some of incident waves and reflecting the other. The second multiple scattering amplifier 153 may be configured as a reflective multiple scattering amplifier for reflecting all of incident waves.

The pattern structure inspection apparatus 100 may further include the controller 140 and the display 190.

The controller 140 analyzes the speckle data collected by the data collector 130, and transmits the analysis result to the display 190. For example, the controller 140 may analyze the shape of the laser speckles and determine whether the shape of the pattern structure of the sample equals a preset designed shape.

The display 190 may display the analysis result of the controller 140 to be viewed to a user.

Figure 5A:
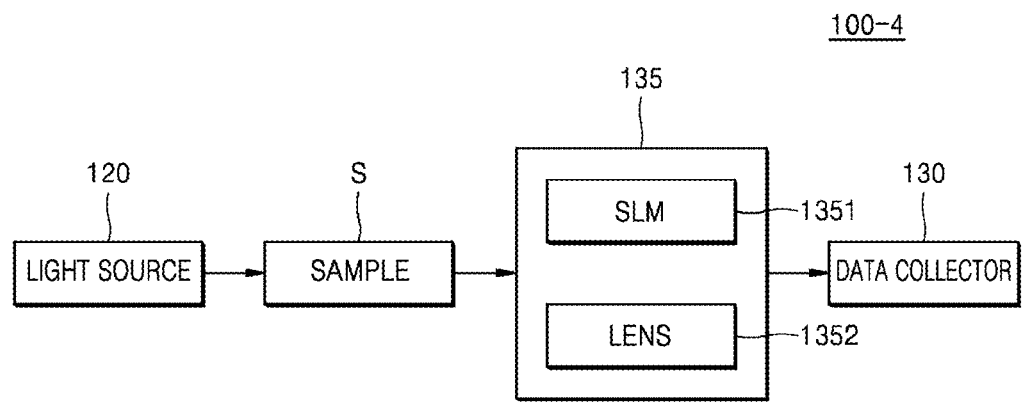
FIGS. 5A and 5B are conceptual views of a pattern structure inspection apparatus according to another embodiment of the present invention.
Figure 5B:
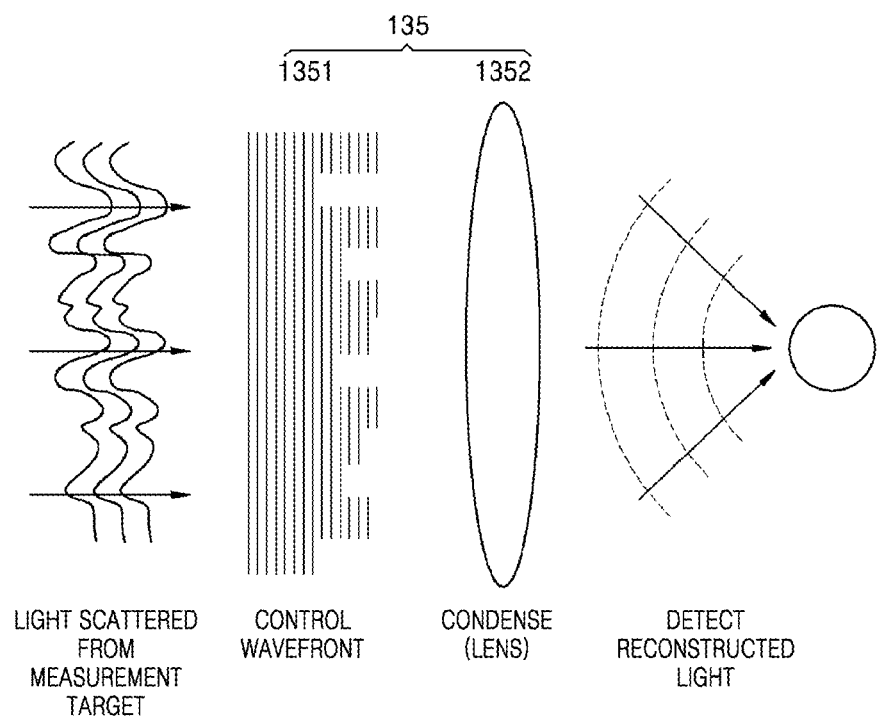

FIGS. 5A and 5B are conceptual views of a pattern structure inspection apparatus 100-4 according to another embodiment of the present invention. For convenience of explanation, FIGS. 5A and 5B are focused on the relationship between an optical unit 135 and the data collector 130.

Referring to FIGS. 5A and 5B, the pattern structure inspection apparatus 100-4 may further include the optical unit 135 for reconstructing and modulating a first wave signal scattered from a sample, into a second wave signal corresponding to a wave irradiated from the light source 120 and not yet scattered by the sample. In this case, the optical unit 135 may include a spatial light modulator (SLM) 1351 and a data collector 130. When waves scattered from a measurement target are incident, the optical unit 135 may reconstruct a not-scattered wave (or beam) by controlling wavefronts of the scattered waves, and provide the reconstructed wave to the data collector 130.

The waves (or beams) scattered from the sample may be incident on the SLM 1351. The SLM 1351 may control wavefronts of the waves scattered from the sample and provide the controlled waves to the lens 1352. The lens 1352 may condense the controlled waves and provide the condensed wave to the data collector 130. The data collector 130 may detect the wave condensed by the lens 1352 and reconstruct and output the condensed wave into and as the not-scattered wave initially output from the light source 120.

Figure 6:
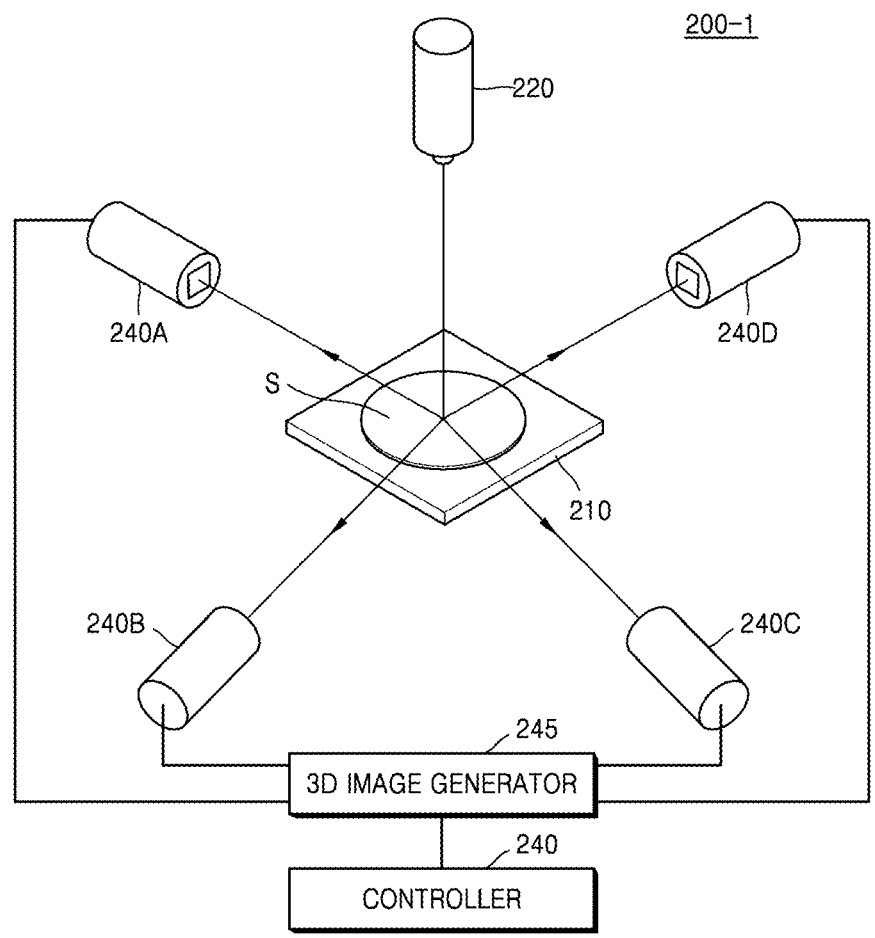
FIGS. 6 and 7 are conceptual views of pattern structure inspection apparatuses according to second and third embodiments of the present invention.

FIG. 6 is a conceptual view of a pattern structure inspection apparatus 200-1 according to a second embodiment of the present invention. In the second embodiment, the pattern structure inspection apparatus 200-1 may include two or more data collectors (e.g., 230A, 230B, 230C, and 230D). In this case, the pattern structure inspection apparatus 200-1 may further include a three-dimensional (3D) image generator 245 for generating a 3D speckle image by using a plurality of laser speckle signals detected by a plurality of data collectors 230A, 230B, 230C, and 230D. The number of data collectors 230 theoretically required to generate a 3D image is two. However, since a relative image is generated using two data collectors 230, at least three data collectors 230 may be used to generate an absolute 3D image. To increase accuracy, four data collectors 230A, 230B, 230C, and 230D are illustrated in FIG. 6.

Figure 7:
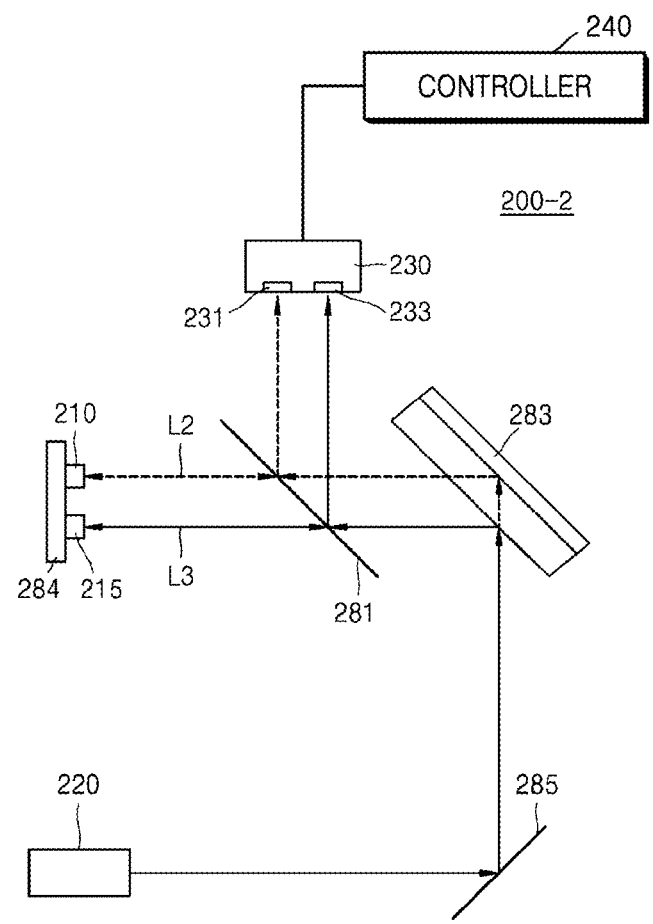

FIG. 7 is a conceptual view of a pattern structure inspection apparatus 200-2 according to a third embodiment of the present invention.

Referring to FIG. 7, the pattern structure inspection apparatus 200-2 according to the third embodiment may include a sample holder 210, a reference sample holder 215, a light source 220, a data collector 230, a controller 240, a beam splitter 281, and a multi-beam reflector 283. Except that the reference sample holder 215 is further included and thus waves are provided in different paths, elements according to the current embodiment are the same as those according to the afore-described embodiments and thus repeated descriptions thereof will not be provided herein. The reference sample holder 215 may be located adjacent to the sample holder 210 and may accommodate a reference sample.

For example, the reference sample may be a reference semiconductor device verified as being normally manufactured, and a sample may be a semiconductor device to be inspected to determine whether a process is normally performed.

The light source 220 may irradiate a laser wave toward the sample in the sample holder 210 and the reference sample in the reference sample holder 215. Herein, the multi-beam reflector 283 and the beam splitter 281 may be located between the light source 220 and the sample and reference sample holders 210 and 215. The pattern structure inspection apparatus 200-2 may further include a mirror 285 for changing a path of the wave provided from the light source 220.

The multi-beam reflector 283 may split the wave incident from the light source 220, and provide the split waves along a plurality of paths. The multi-beam reflector 283 may reflect the wave separately on front and rear reflection surfaces thereof, and provide a first wave L2 and a second wave L3, which are split from the incident wave and are parallel to each other.

The beam splitter 281 may be located on the plurality of paths of the waves provided by the multi-beam reflector 283, and may provide the first and second waves L2 and L3 respectively to the sample and the reference sample. Thereafter, the beam splitter 281 may change paths of waves reflected and emitted from the sample and the reference sample, and provide the waves to the data collector 230.

The data collector 230 may detect first laser speckles and second laser speckles respectively generated due to multiple scattering of the waves from the sample and the reference sample. The data collector 230 may include a first data collector 231 located to correspond to a path of the first waves L2 reflected from the sample and a second data collector 233 located to correspond to a path of the second waves L3 reflected from the reference sample.

The controller 240 compares the first laser speckle data to the second laser speckle data and determines whether a difference value between the first laser speckle data and the second laser speckle data is equal to or less than a preset reference value. When the difference value between the first laser speckle data and the second laser speckle data is equal to or less than the reference value, a pattern structure of the semiconductor device serving as the sample may be determined as being normal like that of the reference semiconductor device. Otherwise, the pattern structure of the semiconductor device serving as the sample may be determined as having an abnormal region and thus it may be regarded that an error has occurred in a manufacturing process.

Figure 8:
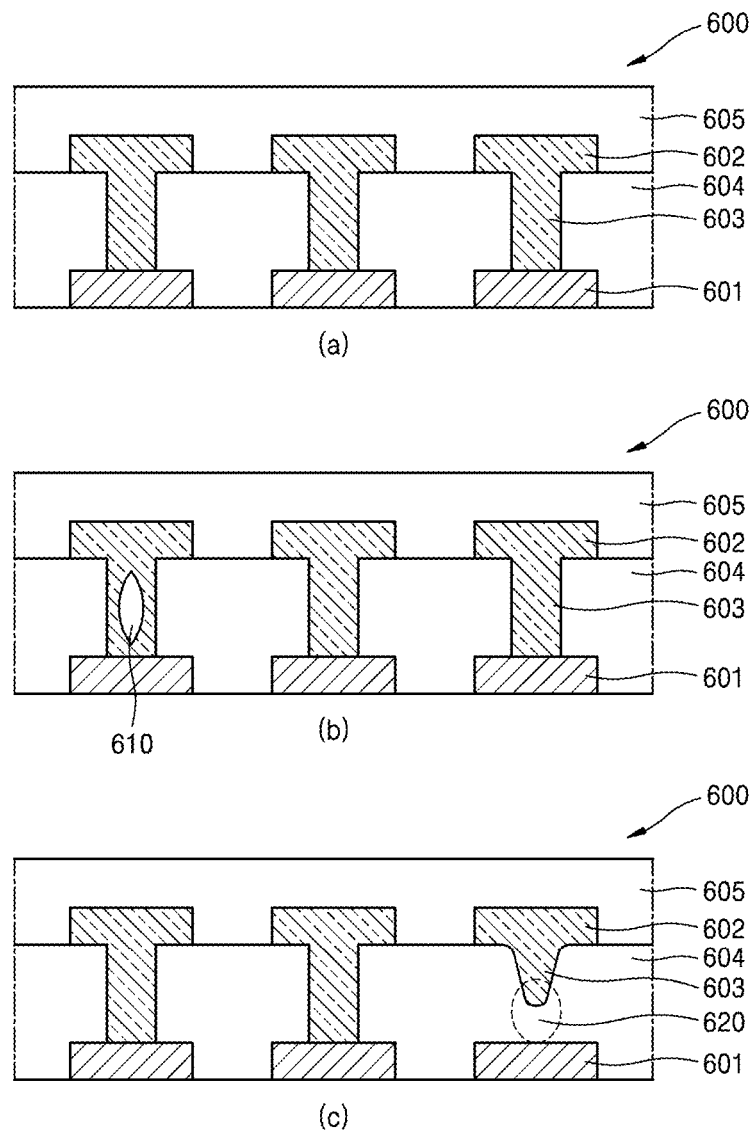
FIGS. 8A to 8C are cross-sectional views of semiconductor devices having multi-layer metallization structures.

FIGS. 8A to 8C are cross-sectional views of semiconductor devices having multi-layer metallization structures as examples of a sample. A speckle pattern analysis method using a variation in a sample structure will now be described with reference to FIGS. 8A to 8C.

FIG. 8A shows a case when a process is normally performed, FIG. 8B shows a case when a via has a void 610, and FIG. 8C shows a case when a contact penetrating through an insulating layer 604 is not completely generated.

The sample is mounted in a sample holder, a laser beam is irradiated onto the sample, and laser speckle data scattered from the sample is collected. The collected data is analyzed by a data analyzer. The data analyzer includes a controller and a display.

The controller of the data analyzer is connected to a database (DB) storing laser speckle data of a reference sample, i.e., FIG. 8A. The controller compares the collected laser speckle data to the laser speckle data of the reference sample, which is pre-stored in the DB, and calculates a difference value between speckle patterns thereof. When the difference value is equal to or less than a preset reference value, it may be determined that the analyzed sample has the same structure as the reference sample and thus a process is normally performed.

Otherwise, when a process is abnormally performed and thus a pattern has a defect as illustrated in FIG. 8B or 8C, the difference value between the collected speckle data and the speckle data of the reference sample will be large and will exceed the preset reference value. Therefore, it may be determined that the process is abnormally performed.

The determination result of the controller is transmitted to a display and is output to be viewed to a user.

Figure 9:
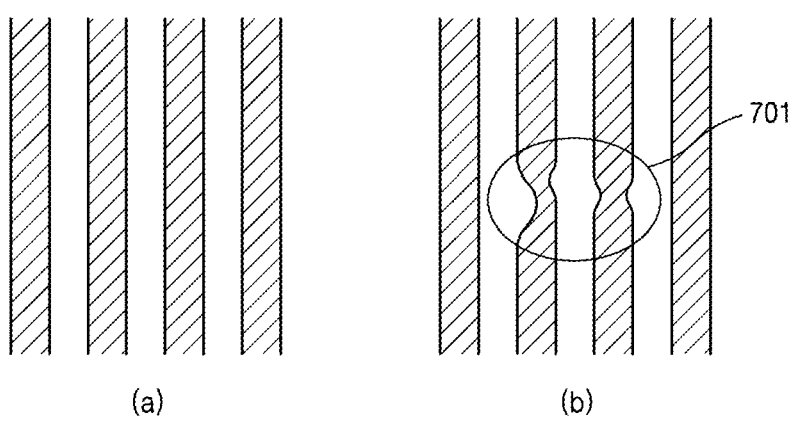
FIGS. 9A and 9B are plan views of metallization structures of semiconductor devices.

As another example, FIGS. 9A and 9B illustrate a laser speckle analysis method for detecting a variation in a line width of metal wires. When a sample has a normal line width of metal wires as illustrated in FIG. 9A, a difference value between the sample and a reference sample will be equal to or less than a preset reference value. However, when the sample has an abnormal line width region 701 as illustrated in FIG. 9B, the difference value between the sample and the reference sample will be remarkable. Therefore, it may be determined that a process is abnormally performed.

Simulation may be performed to check laser speckle results of different pattern structures like those illustrated in FIGS. 9A and 9B.

Figure 10:
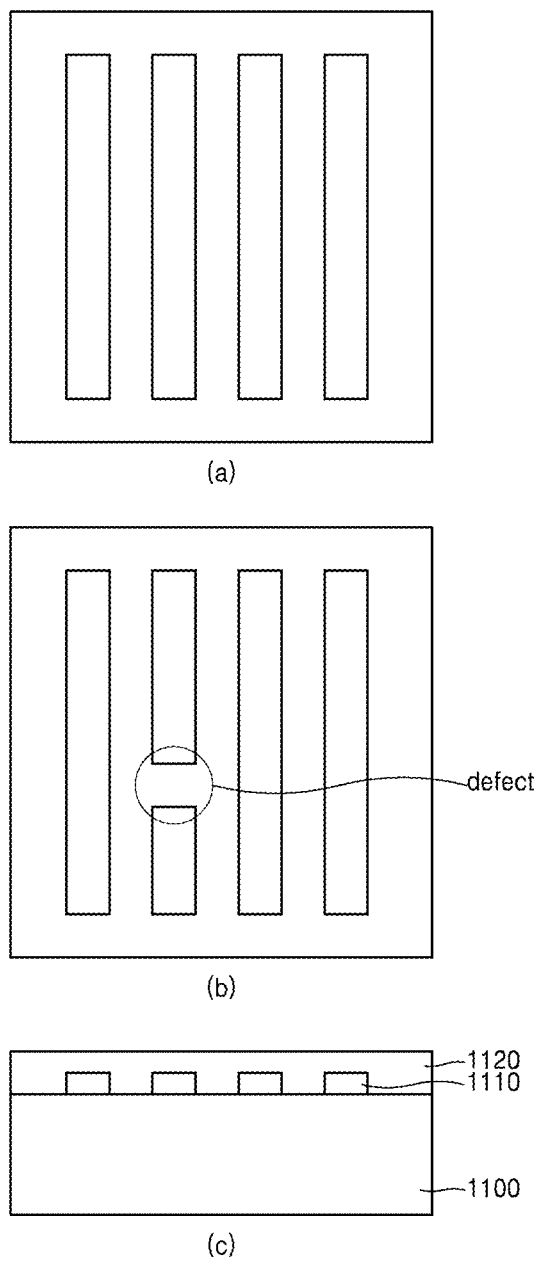
FIGS. 10A to 10C are plan and cross-sectional views of semiconductor devices designed to simulate laser speckle analysis.

FIGS. 10A to 10C are plan and cross-sectional views of semiconductor devices designed for simulation. FIG. 10C illustrates a cross-section of the semiconductor device designed for simulation. Referring to FIG. 10C, a substrate 1100 is provided as a monocrystalline silicon substrate, and metal wires 1110 made of aluminum and spaced apart from each other by a certain distance are generated on the substrate 1100. A silicon oxide layer 1120 is coated on the metal wires 1110. In FIGS. 10A to 10C, a grid spacing is 100 nm and a laser beam irradiated from a light source has a wavelength of 532 nm.

FIG. 10A shows a case when the metal wires are normally generated, and FIG. 10B shows a case when a defect occurs in one of the metal wires.

Figure 11A:
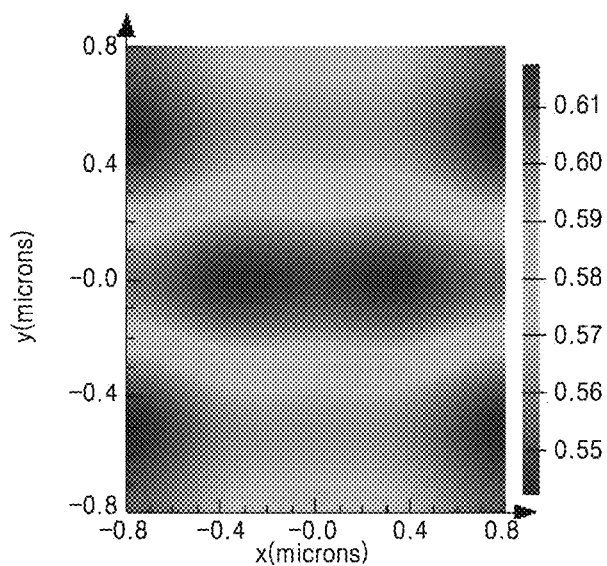
FIGS. 11A and 11B are graphs showing the simulation results of laser speckle analysis.
Figure 11B:
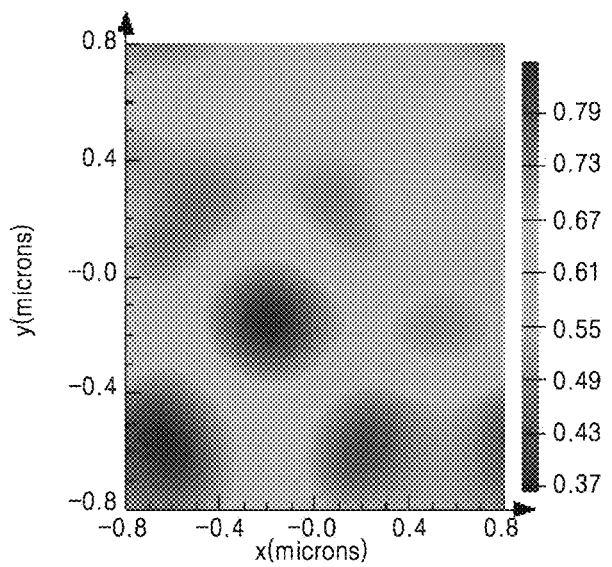

FIGS. 11A and 11B are graphs showing the simulation results. FIG. 11A shows a laser speckle result of the structure illustrated in FIG. 10A, and FIG. 11B shows a laser speckle result of the structure illustrated in FIG. 10B.

As shown in FIGS. 11A and 11B, the laser speckle result in a case when the metal wires are abnormally generated (FIG. 11B) remarkably differs from the laser speckle result in a case when the metal wires are normally generated (FIG. 11A). It may be determined whether a metal wire patterning process has an error, by comparing the results of FIGS. 11A and 11B.

Figure 12:
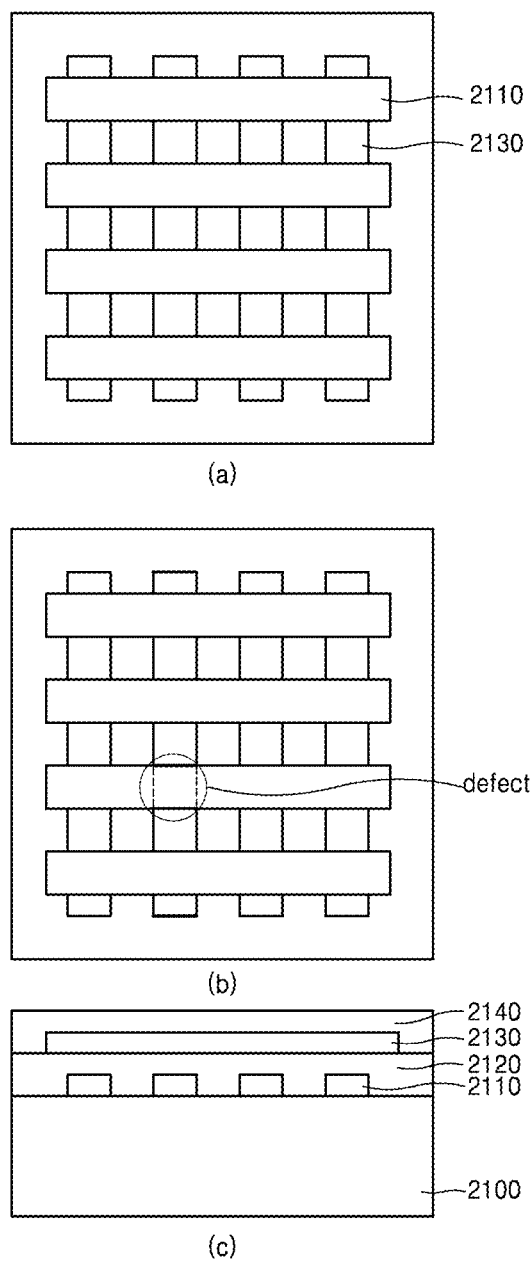
FIGS. 12A to 12C are plan and cross-sectional views of other semiconductor devices designed to simulate laser speckle analysis.

FIGS. 12A to 12C are plan and cross-sectional views of other semiconductor devices designed for simulation. FIG. 12C illustrates a cross-section of the semiconductor device designed for simulation. Referring to FIG. 12C, a substrate 2100 is provided as a monocrystalline silicon substrate, and first metal wires 2110 made of aluminum and spaced apart from each other by a certain distance are generated on the substrate 2100. A silicon oxide layer serving as a first insulating layer 2120 is coated on the first metal wires 2110. Second metal wires 2130 extending in a direction perpendicular to the first metal wires 2110 are generated on the first insulating layer 2120 and then a silicon oxide layer serving as a second insulating layer 2140 is coated on the second metal wires 2130. The first and second metal wires 2110 and 2130 are both made of aluminum.

FIG. 12A shows a case when both of the first and second metal wires 2110 and 2130 are normally generated, and FIG. 12B shows a case when a defect occurs in one of the first metal wires 2110. In FIG. 12B, since the second metal wires 2130 are normally patterned, the defect of the first metal wires 2110 is blocked by the second metal wires 2130 and thus is not observed on the plan view. In FIGS. 12A to 12C, a grid spacing is 100 nm and a laser beam irradiated from a light source has a wavelength of 532 nm.

Figure 13A:
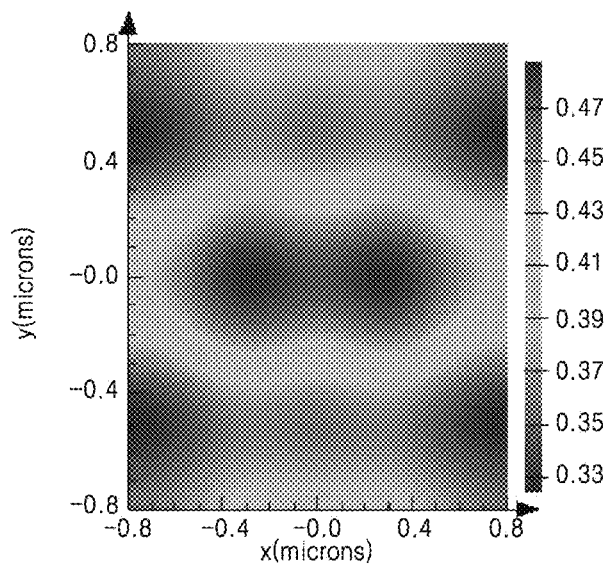
FIGS. 13A and 13B are graphs showing the simulation results.
Figure 13B:
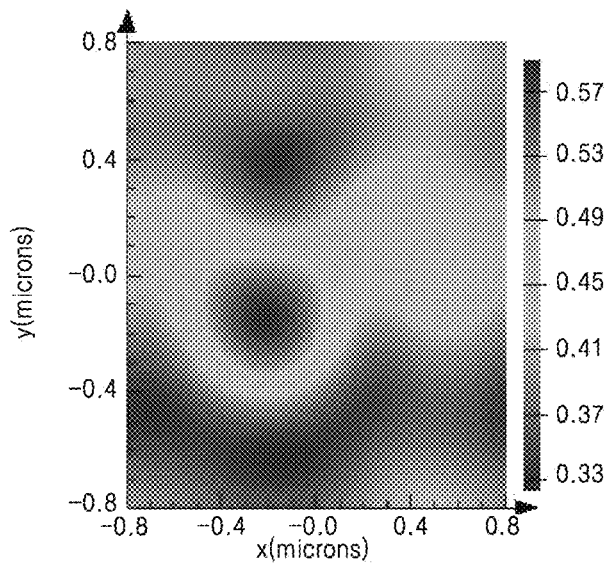

FIGS. 13A and 13B are graphs showing the simulation results. FIG. 13A shows a laser speckle result of the structure illustrated in FIG. 12A, and FIG. 13B shows a laser speckle result of the structure illustrated in FIG. 12B.

As shown in FIGS. 13A and 13B, the laser speckle result in a case when the metal wires are abnormally generated (FIG. 13B) remarkably differs from the laser speckle result in a case when the metal wires are normally generated (FIG.

13A). It may be determined whether a metal wire patterning process has an error, by comparing the results of FIGS. 13A and 13B.

Particularly, in FIG. 13B, since the metal wires in a top layer are opaque in a visible light range, an abnormal pattern region (i.e., a defect) thereunder may not be easily observed using a general inspection method. However, according to the present invention, when an abnormal speckle pattern is detected, it may be regarded that an abnormal pattern region is present under the top metal wires.

As another example, a defect of an active region generated by injecting ions into a silicon substrate may also be detected in the same manner.

Another laser inspection apparatus according to an embodiment of the present invention may perform an inspection function on each of a plurality of pattern regions periodically repeated on a substrate of a device. Representatively, for example, the laser inspection apparatus may sequentially inspect a plurality of pattern regions on a silicon wafer to detect whether a pattern structure of each pattern region within the silicon wafer has a defect.

Figure 14:
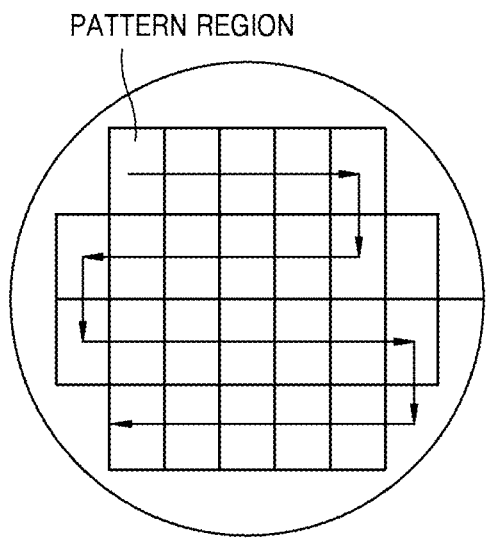
FIG. 14 is a plan view of an example of a silicon wafer including a plurality of pattern regions thereon.
Figure 15:
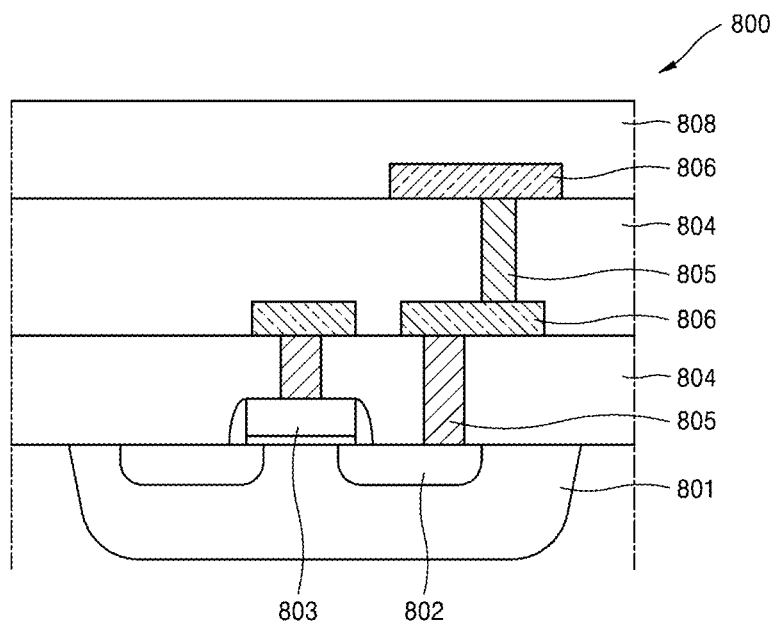
FIG. 15 is a cross-sectional view of a general metal-oxide-semiconductor field-effect transistor (MOSFET) device.

FIG. 14 is a plan view of an example of a plurality of pattern regions on a silicon wafer. In this case, the pattern regions are regions to be ultimately sawed from the silicon wafer into individual devices.

Using a pattern structure inspection apparatus according to an embodiment of the present invention, a laser beam is irradiated onto the plurality of pattern regions in a sequential manner, e.g., in order of arrows of FIG. 14, from a top left pattern region, and a data collector collects laser speckle data from each pattern region and stores the laser speckle data in a DB.

A data analyzer analyzes the laser speckle data of the pattern regions, which is stored in the DB, and sets a criterion for determining a defect of each pattern region. For example, the intensity or shape of a laser speckle pattern may serve as a characteristic for setting the criterion. After the characteristic for setting the criterion is determined, statistical analysis, e.g., calculation of an average and a standard deviation, is performed on all the pattern regions. The calculated average and standard deviation are set as the criterion.

For example, when laser speckle data collected from a pattern region remarkably differs from the average, the pattern region may be determined as having a different structure from the other pattern regions and may be regarded as a region on which a process is abnormally performed. Therefore, by outputting information about the abnormal pattern region, a user may obtain the information about the abnormal pattern region without cutting the silicon wafer and inspecting each sample.

While the present invention has been particularly shown and described with reference to embodiments thereof, it will be understood by one of ordinary skill in the art that various changes in form and details may be made therein without departing from the scope of the present invention as defined by the following claims.

INDUSTRIAL APPLICABILITY

According to an embodiment of the present invention, a defect of a multi-layer pattern structure on a substrate may be rapidly detected in a non-destructive manner. According to an embodiment of the present invention, not only a defect of a pattern in a top layer of the pattern structure but also a defect of patterns thereunder may be rapidly detected. As such, time efficiency may be increased. In addition, inspection costs may be reduced based on various inspection methods.

What is claimed is:

1. A pattern structure inspection apparatus comprising:
   a wave source for irradiating a wave onto a sample comprising a pattern region in which a structure having a certain pattern is provided on a substrate;
   a data collector for collecting speckle data generated due to multiple scattering of the irradiated wave by the sample;
   a data analyzer for receiving and analyzing the speckle data collected by the data collector, and outputting an analysis result on a display; and
   a multiple scattering amplifier for amplifying a number of times that the wave is multiple-scattered in the sample, by reflecting at least some waves multiple-scattered and emitted from the sample, back to the sample,
   wherein the multiple scattering amplifier comprises:
      a first multiple scattering amplifier located on an extension line passing through a center of the sample, to reflect at least some waves multiple-scattered and emitted from the sample, back to the sample; and
      a second multiple scattering amplifier located at an opposite side of the first multiple scattering amplifier with respect to the sample, to reflect at least some waves multiple-scattered and emitted from the sample, back to the sample,
   wherein the data collector collects the speckle data in an area between the sample and the data collector or in an internal area of the data collector.

2. The pattern structure inspection apparatus of claim 1, wherein the data collector collects the speckle data in a first area spaced apart from a surface of the sample by a certain distance.

3. The pattern structure inspection apparatus of claim 2, wherein the first area is located between a first surface comprising a first point spaced apart from the surface of the sample by a first distance, and a second surface comprising a second point spaced apart from the surface of the sample by a second distance greater than the first distance.

4. The pattern structure inspection apparatus of claim 1, further comprising a three-dimensional (3D) image generator for generating a 3D speckle image by using a plurality of speckle signals detected by a plurality of data collectors, when the data collector comprises the plurality of data collectors,
   wherein the controller analyzes characteristics of the sample by using the 3D speckle image.

5. A pattern structure inspection apparatus comprising:
   a sample holder accommodating a sample and a reference sample holder accommodating a reference sample;
   a wave source for irradiating a wave onto the sample and the reference sample;
   a data collector for collecting speckle data generated due to multiple scattering of the irradiated wave by each of the sample and the reference sample;
   a data analyzer for receiving and analyzing the speckle data collected by the data collector, and outputting an analysis result on a display;
   a multi-beam reflector for splitting the wave incident from the wave source, and providing the split waves along a plurality of paths; and
   a beam splitter located on the plurality of paths of the waves provided by the multi-beam reflector, to change paths of waves reflected and emitted from the sample and the reference sample, and provide the waves to the data collector, wherein each of the sample and the reference sample comprises a pattern region in which a structure having a certain pattern is provided on a substrate.

6. The pattern structure inspection apparatus of claim 5, wherein the data collector collects the speckle data in an area between the sample and the data collector or in an internal area of the data collector.

* * * * *